(12) United States Patent
Su (10) Patent No.: US 8,944,734 B2
(45) Date of Patent: Feb. 3, 2015

(54) BIMATE SCREW

(75) Inventor: Guo-Cai Su, Kaohsiung (TW)

(73) Assignee: Taiwan Shan Yin Int'l Co., Ltd., Kaohsiung (TW)

( * ) Notice: Subject to any disclaimer, the term of this patent is extended or adjusted under 35 U.S.C. 154(b) by 1505 days.

(21) Appl. No.: 12/003,516

(22) Filed: Dec. 28, 2007

(65) Prior Publication Data

US 2009/0169334 A1 Jul. 2, 2009

(51) Int. Cl.
| F16B 25/04 | (2006.01) |
| F16B 25/10 | (2006.01) |
| F16B 25/00 | (2006.01) |
| F16B 33/02 | (2006.01) |

(52) U.S. Cl.
CPC ............. *F16B 25/10* (2013.01); *F16B 25/0015* (2013.01); *F16B 25/0052* (2013.01); *F16B 25/0057* (2013.01); *F16B 25/0063* (2013.01); *F16B 25/0068* (2013.01); *F16B 2033/025* (2013.01)
USPC ............ 411/386; 411/411; 411/412; 411/418

(58) Field of Classification Search
USPC ............ 411/411, 412, 418, 420, 311, 386, 42
See application file for complete search history.

(56) References Cited

U.S. PATENT DOCUMENTS

| 497,510 | A | * | 5/1893 | Adler | 411/421 |
| RE28,111 | E | * | 8/1974 | Laverty | 411/412 |
| 6,056,491 | A | * | 5/2000 | Hsu | 411/418 |
| 7,040,850 | B2 | * | 5/2006 | Gaudron | 411/412 |
| 7,654,785 | B2 | * | 2/2010 | Chen | 411/421 |
| 7,704,030 | B2 | * | 4/2010 | Chen | 411/411 |
| 2007/0036634 | A1 | * | 2/2007 | Lung | 411/412 |
| 2008/0050200 | A1 | * | 2/2008 | Su | 411/411 |

* cited by examiner

*Primary Examiner* — Flemming Saether
(74) *Attorney, Agent, or Firm* — Rosenberg, Klein & Lee (57) ABSTRACT

The present invention pertains to a bimate screw providing with a first section alternating with a second threaded section; wherein, the second threaded section has a smaller outer diameter than the first threaded section, and further a plurality of concavities are disposed on each thread of the second threaded section for defining two flanks therein. In this manner, both the first and the second threaded sections facilitate to sever and shatter cuttings so as to reduce the screwing resistance and prevent the object from being damaged under the accumulation of cuttings; simultaneously, the bimate screw effectively attains to a good resistance of extraction from the object by the concavities receiving the remaining cuttings which are not guided out of the object.

6 Claims, 8 Drawing Sheets

United States Patent US 8,944,734 B2

BIMATE SCREW

BACKGROUND OF THE INVENTION

1. Field of the Invention

The present invention relates to a screw, in particularly a bimate screw.

2. Description of the Related Art

Figure 1:
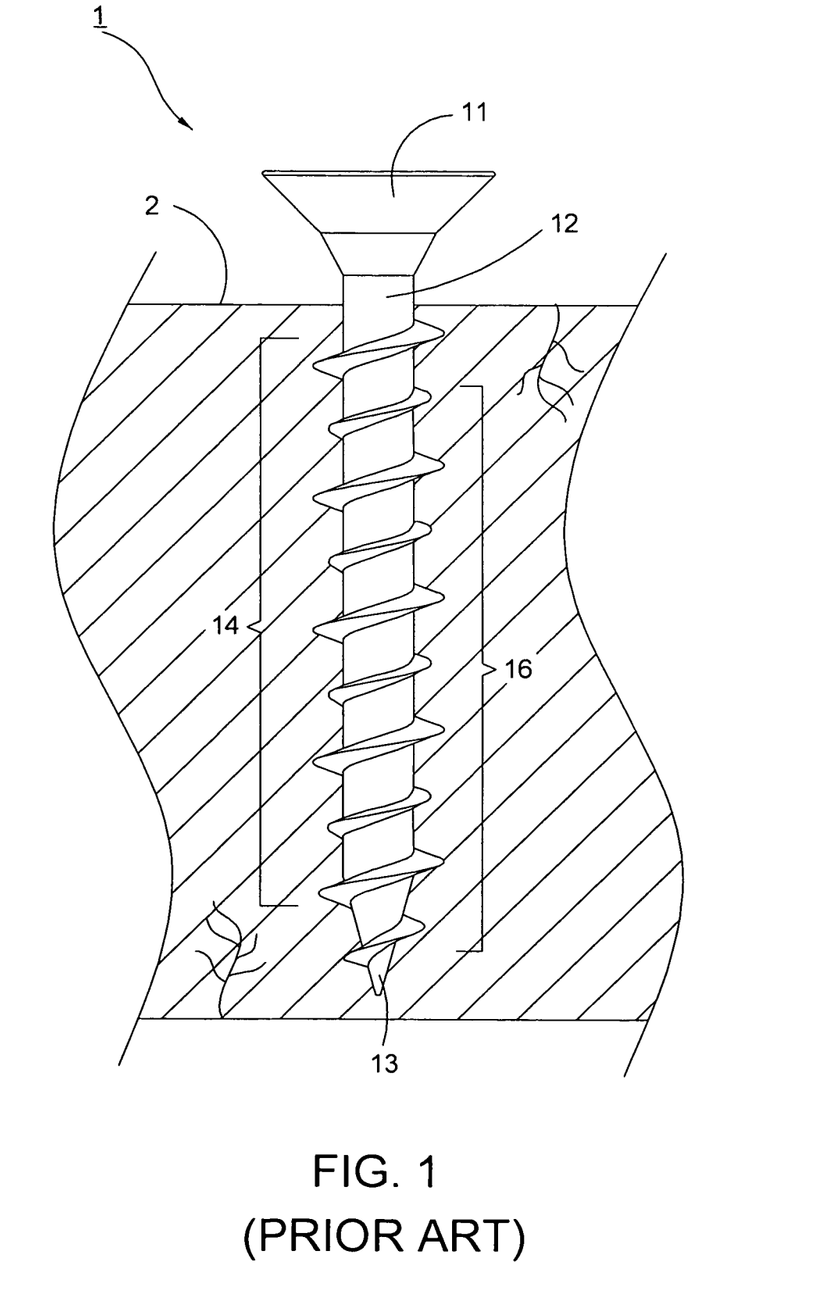
FIG. 1 is a schematic view showing a conventional invention screwing into the object.

Referring to FIG. 1, a conventional screw 1 comprises a shank 12, a head 11 disposed on one side thereof, a distal end 13 on the other side thereof, and a first threaded section 14 and a second threaded section 16 spirally arranged on the shank 12; wherein the two threaded sections 14, 16 alternate with each other. While screwing, the end 13 is initially drilled into the object 2, and the two threaded sections 14, 16 assist to cut the fibers so that the screw 1 can be screwed into the object 2.

Generally, in view of the two threaded sections 14, 16 and the threads thereof, the object fibers and debris may not be thoroughly cut and shattered, which results of those cuttings being normally twisted round the shank 12 and increasing the screwing resistance. Further, the cuttings may be hardly guided out, namely they would be incessantly accumulated in the object 2 and the movement thereof would also be interfered while screwing so that both the object 2 and the screw 1 would be facilely damaged or broken under the pressure of the accumulation. Subsequently, the screw 1 may be successfully screwed into the object 2 but may not substantially embed itself therein. That is, the threads merely push fibers away from their places but do not firmly catch them for a good holding force after screwing in, and the screw 1 thus is turned back toward the surface of the object 2 in response to the resilience of the object fibers and the external force imparted to the object 2, e.g. the vibration on the object; therefore, the objects fastened by the screw 1 would be loose or even fall over and which hence harms the users.

SUMMARY OF THE INVENTION

Therefore, the object of the present invention is to provide a bimate screw which is conducive to reduce the screwing resistance and prevent the screw from being turned back unintentionally and the object from being broken in time of screwing.

The bimate screw in accordance with the present invention mainly comprises a shank, a head, a distal end, and two threaded sections; wherein, a second threaded section spirals round the shank from the distal end toward the head and alternates with a first threaded section, and the second threaded section has an outer diameter smaller than the first threaded section; further, a plurality of concavities are disposed on an circumference of each thread of the second threaded section, and each of the concavities defines two flanks therein. While screwing, the second threaded section assists to cut and shatter the cuttings, so as to decrease the screwing resistance and avoid damaging the object by lowering the possibility of the shank twisted by the debris and reducing the incessant accumulation thereof. Also, the concavities substantially receive the remaining cuttings thereby ensuring a good resistance of extraction.

The advantages of the present invention over the known prior arts will become more apparent to those of ordinary skilled in the art by reading the following descriptions with the relating drawings.

DETAILED DESCRIPTION OF THE PREFERRED EMBODIMENTS

Figure 2:
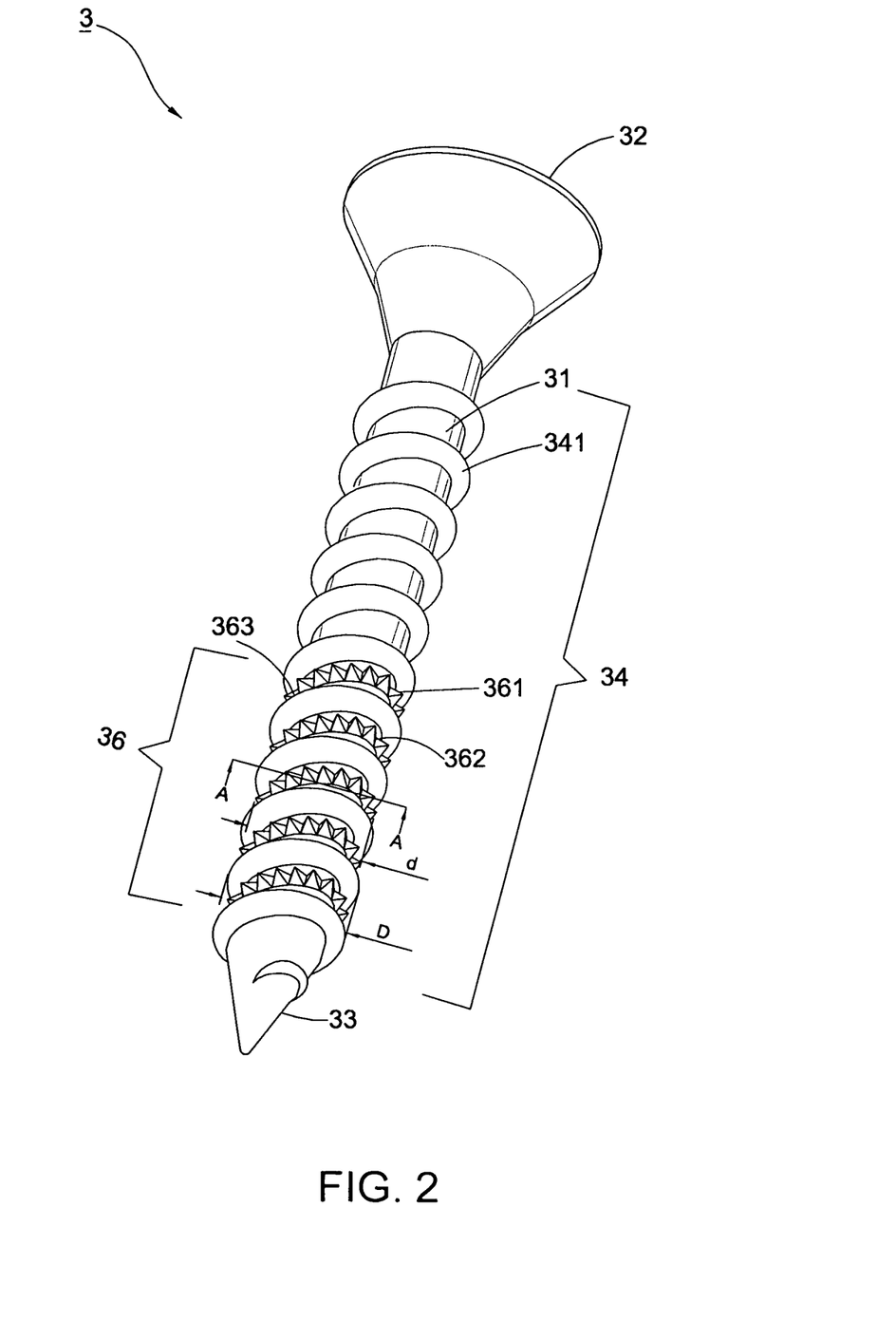
FIG. 2 is a perspective view showing a first preferred embodiment of the present invention.
Figure 3:
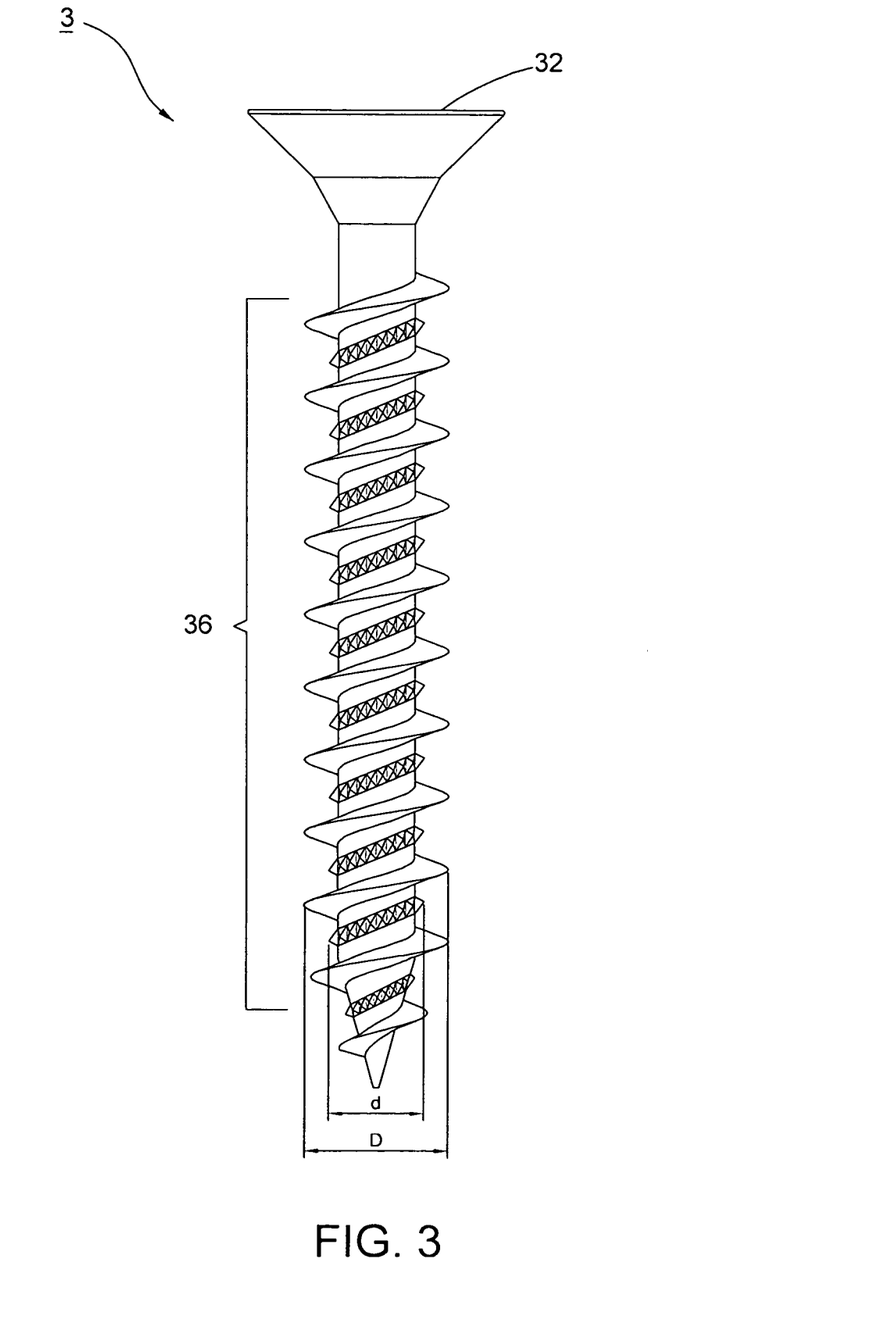
FIG. 3 is an elevation view showing a second preferred embodiment of the present invention.

Referring to FIG. 2, a bimate screw 3 of a first preferred embodiment of the present invention comprises a shank 31, a head 32 disposed on one side of the shank 31, a distal end 33 on the other side thereof which is opposite to the head 32, and a first threaded section 34 and a second threaded section 36 spirally disposed on the shank 31 and respectively consisting of a plurality of threads 341, 361 arranged thereon; wherein, the second threaded section 36 extends from the distal end 33 toward the head 32 and alternates with the first threaded section 34. The second threaded section 36 can appropriately extend around the shank 31 in a certain length (shown in FIG. 2) or ascend thereon to be located adjacent to the head 32, approximately a length of the shank 31 (shown in FIG. 3). Still, an outer diameter "d" of the second threaded section 36 is smaller than an outer diameter "D" the first threaded section 34.

Figure 4:
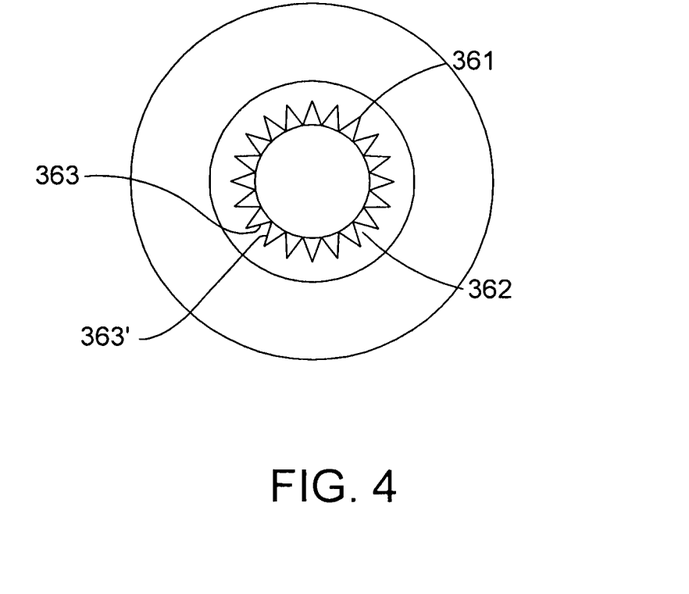
FIG. 4 is a sectional view showing the portion "A" of the first preferred embodiment in FIG. 2.
Figure 5:
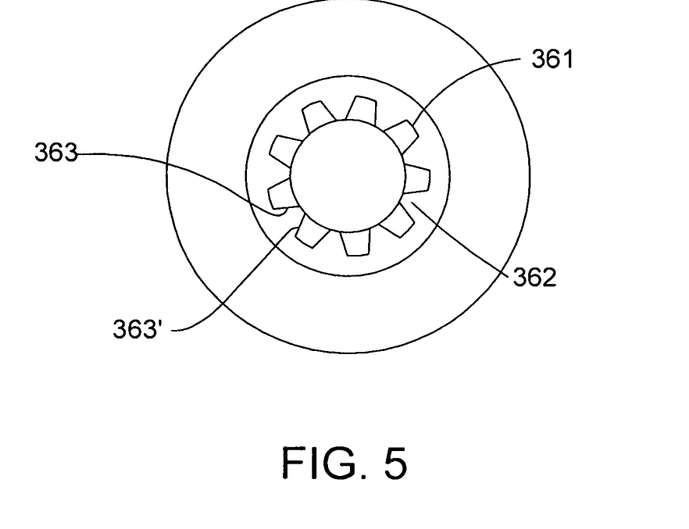
FIG. 5 is a sectional view showing a third preferred embodiment of the present invention.

Further, a plurality of concavities 362 radially disposed around an circumference of each thread 361 of the second threaded section 36, and each of the concavities 362 provides with a leading flank 363 and a trailing flank 363'. The two flanks 363 and 363' converge toward one point, by which the thread 361 is formed in a contour as an incessant hillside around its circumference (shown in FIG. 4); relatively, the two flanks 363, 363' may also be interrupted so that the concavities 362 are evenly spaced and arranged around the circumference of the thread 361 (shown in FIG. 5). Here each thread 361 is adopted to present in a state of serration shown in FIG. 4 in the following preferred embodiments of the present invention.

Figure 6:
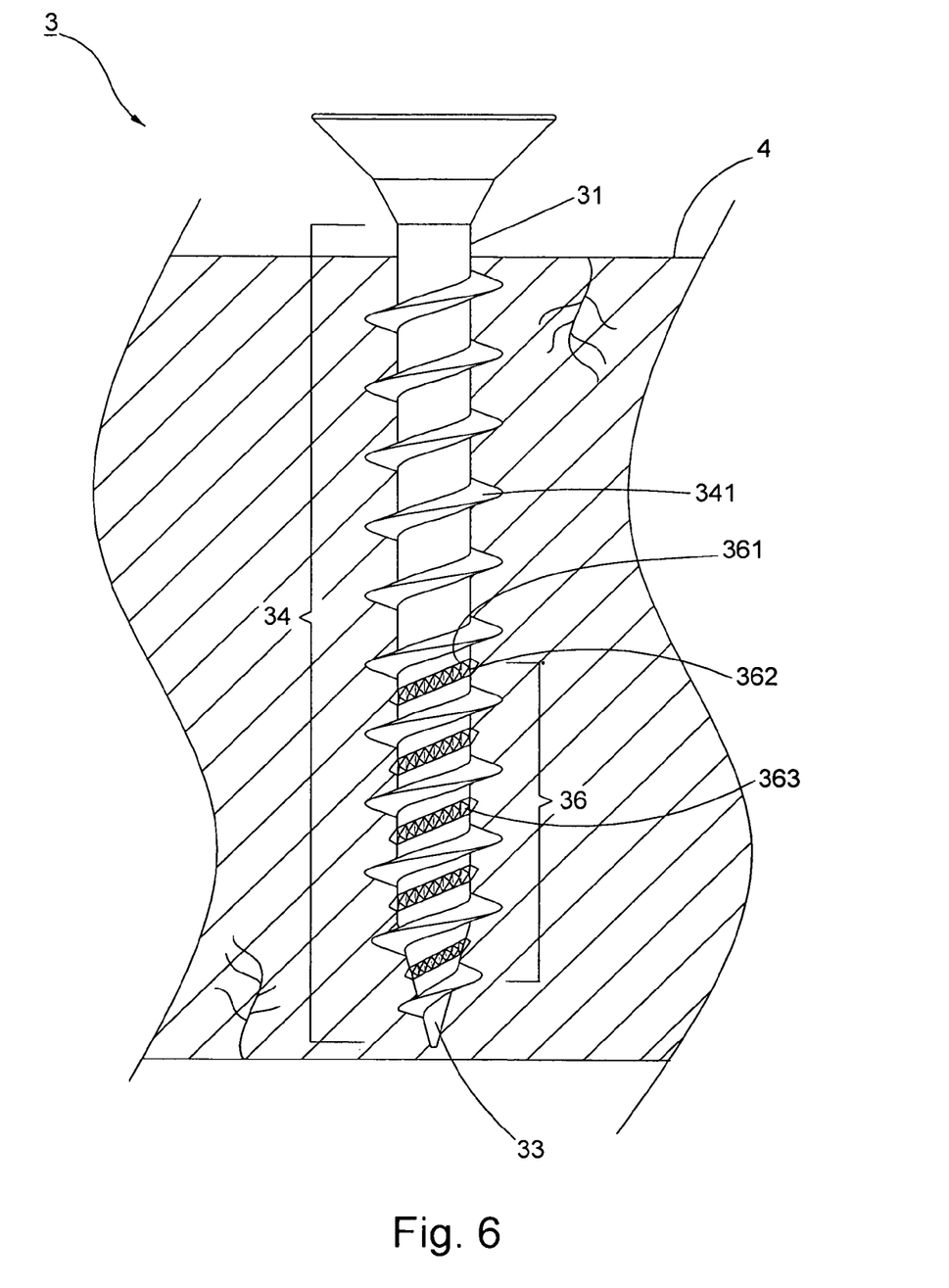
FIG. 6 is a schematic view showing the first embodiment of FIG. 2 screwed into the object.

Referring to FIG. 6, in operation, the distal end 33 is initially drilled into the object 4 (for instance of a wood material), further the first and the second threaded sections 34, 36 are exerted to cut fibers of the object 4, namely the first threaded section 34 firstly cut and sever the fibers into debris and immediately the leading flank 363 and the trailing flank 363' of the second threaded section 36 assist to shatter the debris into a small chips. Subsequently, those cuttings would not be facilely twisted round the shank 31 and not be incessantly accumulated in the object 4, so as to reduce the resistance of screwing and avoid the burst of the object 4 under the pressure of the accumulation. After screwing in, the remaining cuttings which are not guided out of the object 4 would be accommodated between the two threaded sections 34, 36 or be received by the concavities 362 of the thread 361 for obtaining a holding force, whereby the bimate screw 3 can be firmly secured in the object 4 by increasing the resistance of extraction although it is subjected to the external force imparted to the bimate screw 3.

Figure 7:
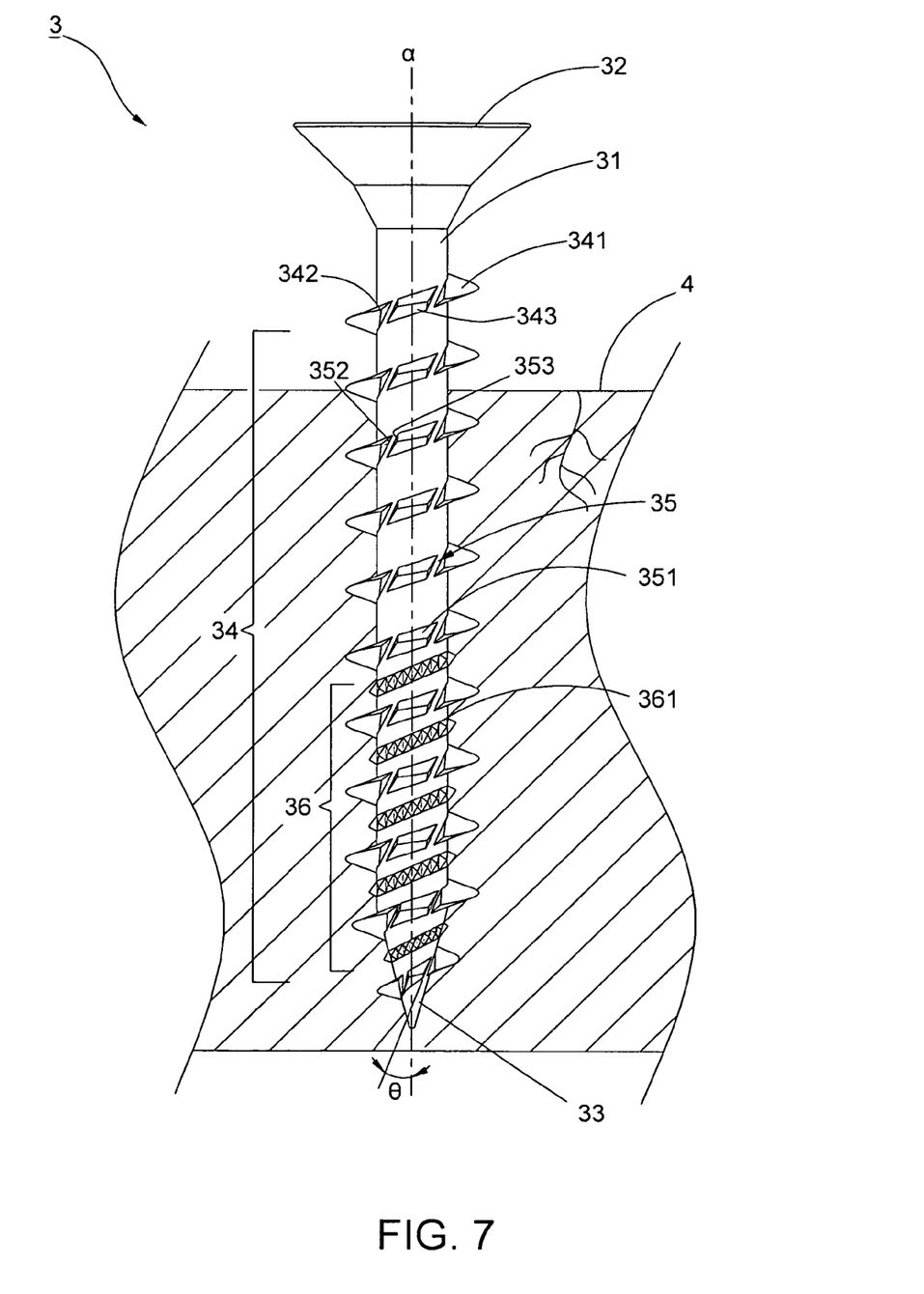
FIG. 7 is a schematic view showing a fourth embodiment of the present invention screwed into the object.

Referring to FIG. 7, a bimate screw 3 of a fourth preferred embodiment is similar to the first preferred embodiment, and the operations and functions are the same. Particularly, each threads 341 on the first threaded section 34 consists of an upper flank 342 and a lower flank 343 and is interrupted by a plurality of slots 35 inclined with respect to a shank axial line "α" by an angle "θ", so as to divide the thread 341 into a plurality of threaded portions 351. Each threaded portion 351 has a first surface 352 and a second surface 353 defined on both side surfaces thereof. Further, the first surface 352 is disposed below the upper flank 342, facing the distal end 33; furthermore, the second surface 353 is disposed above the lower flank 343, facing the head 31; the first surface 352 is parallel to the second surface 353. In this manner, the threaded portions 351 facilitate to guide the debris out of the surface of the object 4 and simultaneously the second threaded section 36 assists to receive the remaining fibers and debris, the bimate screw 3 thus can be rapidly and firmly fixed into the object 4 while screwing.

Figure 8:
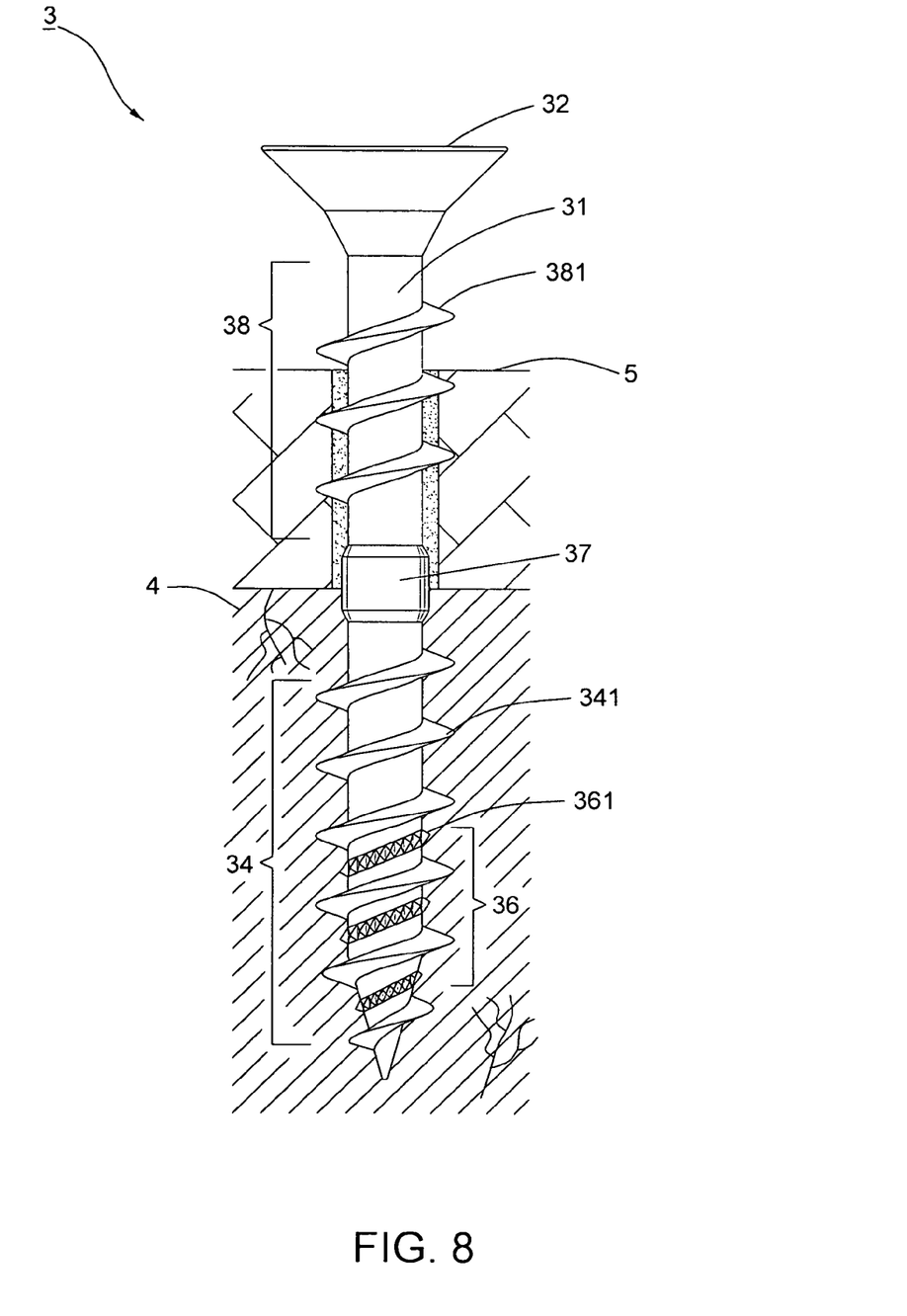
FIG. 8 is a schematic view showing a fifth embodiment of the present invention screwed into the composite objects.
Figure 9:
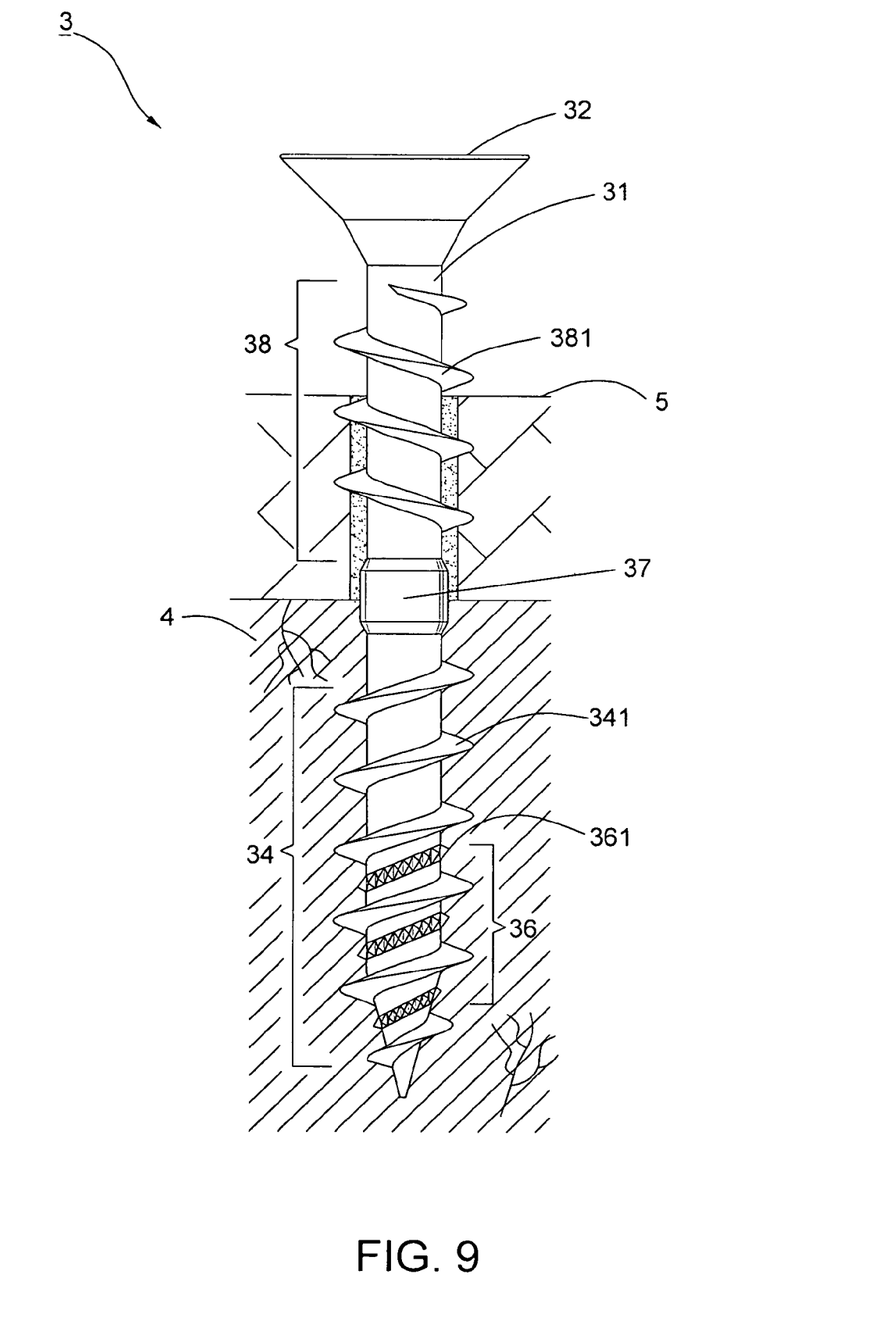
FIG. 9 is a schematic view showing a sixth embodiment of the present invention screwed into the composite objects.

Referring to FIG. 8, a bimate screw 3 of a fifth preferred embodiment also has the elements and operations as the same as the first preferred embodiments. Notably, a third threaded section 38 additionally spirals above the first threaded section 34 and is located adjacent to the head 32, and a thread-free portion 37 is arranged between the first threaded section 34 and the third threaded section 38. Simultaneously, the third threaded section 38 includes a plurality of threads 381 spiraling in a direction as the same as the threads 341, 361 of the first and second threaded sections 34, 36 or in a direction reverse thereto as shown in FIG. 9. Thus, the thread-free portion 37 and the third threaded section 38 assist to guide the remaining cuttings toward a composite lumber 5 for propelling the wood object 4 to closely contact therewith, thereby increasing the screwing capability.

To sum up, the present invention takes advantages of the two threaded sections to enhance the cutting capability, e.g. severing and shattering the cuttings into small chips, and which prevents the cuttings from being twisted round the shank and from being successively accumulated in the object so as to reduce the screwing resistance and the broken of the object. Simultaneously, the remaining cuttings can be received in the concavities thereby ensuring a good resistance of extraction.

While we have shown and described the embodiment in accordance with the present invention, it should be clear to those skilled in the art that further embodiments may be made without departing from the scope of the present invention.

I claim:

1. A bimate screw comprising:
    a shank;
    a head disposed on one side of said shank;
    a distal end on the other side of said shank opposite to said head;
    a first threaded section defined by a first thread spirally disposed on said shank from said distal end toward said head; and
    a second threaded section defined by a second thread spiraling around said shank from said distal end toward said head and ascending thereon, said second thread being located between adjacent turns of said first thread and spaced therefrom to expose portions of said shank between said first and second threads, an outer diameter of said second thread being smaller than an outer diameter of said first thread, said second thread being formed by a plurality of pyramidally shaped teeth spaced one from another by a corresponding one of a plurality of concavities radially disposed around a circumference of said shank, wherein said first thread cuts and severs fibers of a workpiece into debris and said teeth of said second thread breakup the debris into chips, a portion of the chips being accumulated in said concavities and in spaces between said first and second threads for increasing a resistance to extraction of said bimate screw from the workpiece.

2. The bimate screw as claimed in claim 1, wherein, said second thread ascends around said shank to terminate at a location adjacent to said head.

3. The bimate screw as claimed in claim 1, wherein, said first thread includes an upper flank and a lower flank and is interrupted by a plurality of slots inclined with respect to a shank axial line by an angle, to radially divide said first thread into a plurality of thread portions; each of said thread portions has a first surface and a second surface defined on both side surfaces thereof; said first surface extends in a slanted direction from said upper flank to said lower flank, facing said distal end, and said second surface extends in a slanted direction said lower flank to said upper flank, facing said head; said first surface extends in parallel to said second surface.

4. The bimate screw as claimed in claim 1, further comprising:
    a third threaded section, said third threaded section being defined by a third thread spirally disposed on said shank above said first threaded section and is located on a portion of said shank adjacent to said head; and
    a thread-free portion arranged between said first threaded section and said third threaded section.

5. The bimate screw as claimed in claim 4, wherein, said third thread spirals in a direction in common with a direction of said first thread and said second thread.

6. The bimate screw as claimed in claim 4, wherein, said third thread spirals in a direction reverse opposite to a direction of said first thread and said second thread.

\* \* \* \* \*